United States Patent [19]

Box

[11] Patent Number: 4,612,120

[45] Date of Patent: Sep. 16, 1986

[54] AXISYMMETRICAL SEPARATOR FOR SEPARATING SOLIDS AND GAS FROM A FLUID MEDIUM

[75] Inventor: William A. Box, Bethel Park, Pa.

[73] Assignee: United States Steel Corporation, Pittsburgh, Pa.

[21] Appl. No.: 667,517

[22] Filed: Nov. 1, 1984

[51] Int. Cl.[4] .............................................. B01D 45/16
[52] U.S. Cl. ............................. 210/512.1; 210/512.2; 55/421; 55/452; 55/459 R
[58] Field of Search ................... 210/512.1, 512.2, 787, 210/788; 55/459 R, 460; 209/144, 211; 55/199, 204, 205, 421, 447, 452, 454

[56] References Cited

U.S. PATENT DOCUMENTS

| 3,771,290 | 11/1973 | Stethem | 55/205 |
| 4,170,555 | 10/1979 | Vicard | 210/788 |
| 4,278,550 | 7/1981 | Watts | 210/512.1 |
| 4,290,791 | 9/1981 | Matsui et al. | 55/206 |
| 4,384,962 | 5/1983 | Harris | 210/788 |
| 4,390,351 | 6/1983 | Matsui et al. | 210/512.1 |
| 4,469,497 | 9/1984 | Linhardt | 210/512.1 |
| 4,511,474 | 4/1985 | Krishna et al. | 210/512.1 |

FOREIGN PATENT DOCUMENTS 411960  1/1934  United Kingdom ............ 210/512.1

Primary Examiner—Richard V. Fisher
Assistant Examiner—Wanda L. Millard
Attorney, Agent, or Firm—John F. Carney

[57] ABSTRACT

A dimensionally compact centrifugal separator having no moving parts is described that is effective for separating entrained solids and gases from a liquid in order to cleanse the liquid. The internal configuration of the apparatus is such as to effectively clean the liquid while preserving the pressure energy available in the discharged media.

5 Claims, 3 Drawing Figures

AXISYMMETRICAL SEPARATOR FOR SEPARATING SOLIDS AND GAS FROM A FLUID MEDIUM

BACKGROUND OF THE INVENTION

Water that is free of any entrained solids or gaseous contaminants is desirable for many industrial applications. One such application is the ultrasonic inspection of materials in which water is used as the coupling medium between the sensing element and the material being inspected. In some of these applications, one such being shown and described in U.S. patent application Ser. No. 4,526,038, filed Feb. 13, 1984 by W. A. Box and E. R. Rusiecki, the ultrasonic waves generated by a transducer are emitted therefrom and reflected back thereto from the test body through a column of water. The water employed in such apparatus must be sufficiently clean and free of gas to prevent the accumulation of gas bubbles and/or solids on the surface of the piezo-electric crystal of the transducer where the accumulated contaminants would disrupt the emitted electronic signals.

In the past, it has been the practice to remove the aforementioned contaminants from water used as a coupling medium through the use of commercial filters or settling tanks. The use of filters is, however, undesirable because of their need to be frequently cleaned and/or replaced which results not only in high capital and maintenance costs but also in frequent removal of the apparatus from service. The use of settling tanks for contaminant removal purposes is also undesirable, primarily due to the large space requirements and maintenance attendant with their use. Settling tanks are also of questionable effectiveness in delivering water of adequate cleanliness.

For the purpose of solids removal and deaeration of a liquid, the present invention contemplates the use of a small, compact centrifugal separating apparatus having no moving parts. While centrifugal separators are well-known in the art of fluid purification such apparatus is most commonly employed for the separation of particulate solids from gases. Some, moreover, as shown by U.S. Pat. No. 3,771,290 granted Nov. 13, 1973 to Stethem and U.S. Pat. No. 4,290,791 granted Sept. 22, 1981 to Matsui et al have been employed as liquid deaerators. These known separators, however, suffer from many of the aforementioned disadvantages, namely high capital and maintenance costs and of occupying considerable space, associated with the previously mentioned equipment.

It is to the amelioration of the aforementioned problems, therefore, that the present invention is directed.

SUMMARY OF THE INVENTION

According to the present invention, there is provided a centrifugal separator for separating solids and gaseous contaminants from a flowing liquid, comprising an axisymmetric body; at least three axially elongated, concentrically spaced, annular fluid-conducting passages in said body; one of said passages extending from an exterior portion of said body toward the axis thereof; a fluid inlet communicating with said one passage and including means for inducing a free vortex flow in the fluid admitted thereto; the other of said fluid conducting passages having one end of each communicating with said one passage at radially spaced positions therealong; a solids discharge from the inner terminous of said one fluid passage; and means for discharging fluid from each of the other ends of said other fluid-conducting passages.

Accordingly, it is a principle object of the present invention to provide separating apparatus, compact in size, that is effective to remove solids and entrained and dissolved gases from a flowing liquid.

It is also an object of the invention to provide separating apparatus having no moving parts that is essentially self-cleaning and thereby characterized by reduced maintenance costs.

It is yet another object of the invention to provide a solids, gas, liquid separator capable of effecting separation of the contaminants from a liquid at a reduced expenditure of energy.

For a better understanding of the invention, its operating advantages and the specific objectives obtained by its use, reference should be made to the accompanying drawings and description which relate to a preferred embodiment.

DESCRIPTION OF A PREFERRED EMBODIMENT OF THE INVENTION

Figure 2:
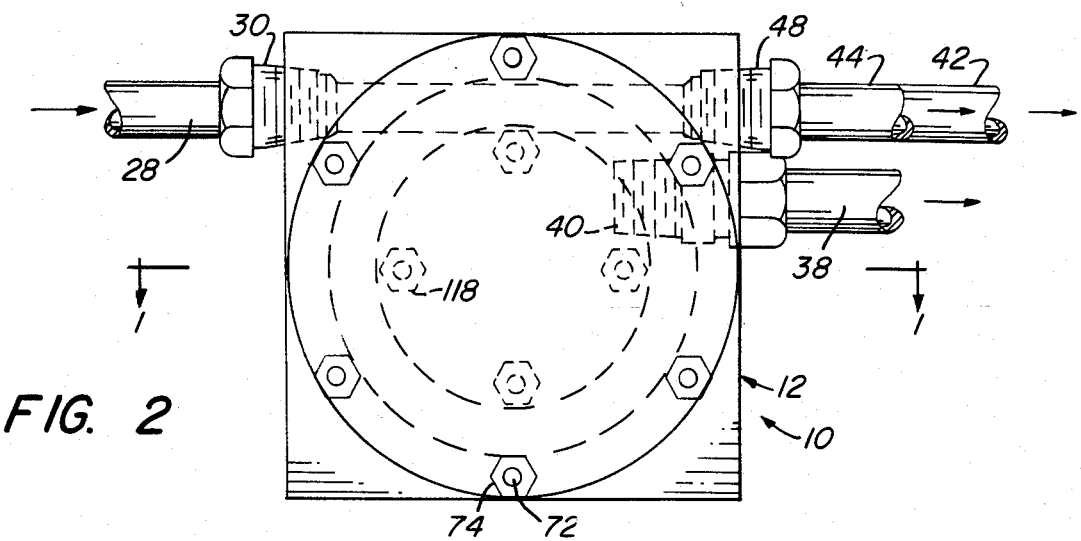
FIG. 2 is a top view of the separator apparatus of FIG. 1.
Figure 1:
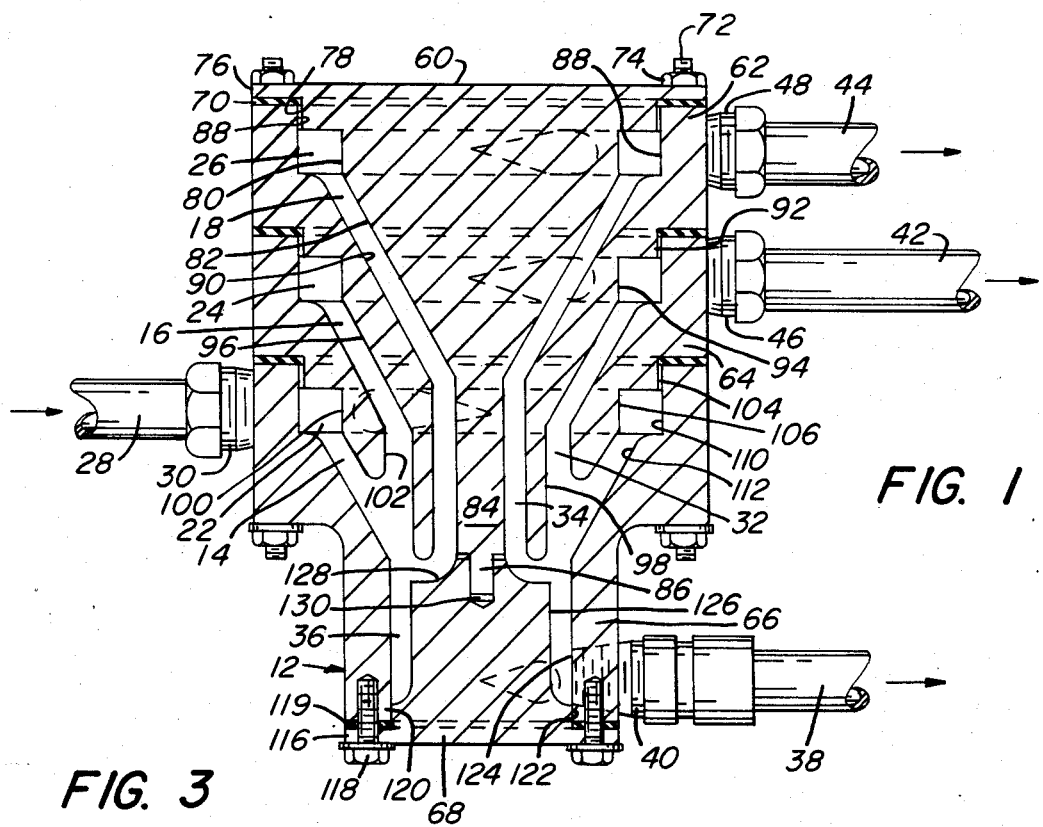
FIG. 1 is an elevational sectional view taken along line 1—1 of a separator apparatus constructed according to the present invention.

With particular reference to FIG. 1 of the drawings, there is shown separating apparatus 10 according to the present invention. The separator 10 comprises an axially elongated body 12 formed of metal, or equivalent material, the interior of which contains a plurality of annular, fluid-conducting passages 14, 16 and 18. Each of the passages 14, 16 and 18 is formed by a pair of concentrically spaced, conically formed walls that extend axially and radially inwardly toward the axis of the body 12 and each of the respective passages has an annular terminous or plenum 22, 24 and 26 communicating with the upper end thereof.

A fluid inlet line 28 is threadedly connected at 30 to the wall of the body 12 and communicates tangentially with the plenum 22. Each of the passages 16 and 18 are caused to communicate with the passage 14 at radially spaced locations therealong by means of cylindrically formed passage extensions 32 and 34, respectively. The lower end of the passage 14 communicates with a cylindrically formed passage 36 that defines a fluid-solids discharge plenum to which a discharge line 38 is threadedly connected at 40 in tangential communication with the plenum. Discharge lines 42 and 44 are similarly connected to the body 12 at 46 and 48 to communicate with the plenums 24 and 26, respectively.

It will be appreciated that the fluid mixture to be processed, namely water with entrained gases and solids in the described illustration, is conducted under pressure by the inlet line 28 and enters the plenum 22 of the separator 10 through the tangential connection where a free vortex flow is induced in the flowing mixture. As the mixture flows from the plenum 22 into and along the passage 14, its tangential velocity increases due to the conical configuration of the passage. This velocity increase creates a pressure gradient across the passage 14 and generates centrifugal forces in the flowing fluid which effect a migration of the heavier elements of the mixture, namely the solids and liquid fractions, toward the radially outer wall of the passage. That fraction of the mixture that remains adjacent the radially inner boundary of the passage 14, namely the gaseous component, air, and a part of the liquid component, water, is caused, due to the pressure gradient, to enter the passage 16 through the passage extension 32 to be conducted therealong to the plenum 24 for discharge out the discharge line 42. The solids fraction of the mixture occupying the radially outer boundary of the passage 14 is caused to flow with a part of liquid into the plenum 36 for discharge out of the apparatus through discharge line 38. The remainder of the process fluid, consisting of essentially clean water, enters the passage 18 through the passage extension 34, to be conducted to the plenum 26 and thence from the separator through the discharge line 44 to its intended point of use.

Figure 3:
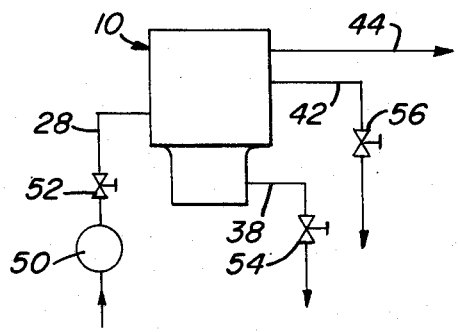
FIG. 3 is a schematic piping diagram of a typical fluid system for application of the separator apparatus of FIGS. 1 and 2.

The disclosed apparatus has particular utility in low fluid pressure applications. As mentioned hereinabove, one such application is a system for delivering clean water to an ultrasonic transducer as described in U.S. patent application Ser. No. 4,526,038. A typical system employed in such application for regulating the cleanliness and flow of the water delivered to the transducer (not shown) is schematically illustrated in a simplified fashion in FIG. 3 in which the inlet line 28 contains a pressure regulator 50 and flow regulating valve 52 and discharge lines 38 and 42 are provided with similar flow regulating valves 54 and 56, respectively. Line 28 is connected to a source of water (not shown) that typically may be at about 30 psi line pressure. The desired water pressure to the separator 10, as determined by that required for use by the transducer, typically about 1 psi, plus the pressure losses in the separator and line losses, is set by the pressure regulator 50 and the flow to the separator 10 through the inlet line 28 is set by the valve 52. It will be appreciated that, by appropriate adjustment of the valves 54 in solids discharge line 38 and 56 in the air discharge line 42, the cleanliness of the water delivered to the transducer through line 44 can be controllably regulated in response to the characteristics of the liquid entering the separator 10. Specifically, if liquid rich in solids is obtained from the liquid source, the flow through the solids discharge line 38 is increased with compensating changes being made in the lines 28 and 42 to maintain the desired flow through the clean water line 44. Conversely, if a gas-rich liquid is caused to enter the separator 10, the fraction discharged through line 42 is increased with compensating adjustments being made in the lines 28 and 38 for maintenance of the desired flow through line 44.

The described separator apparatus 10 can be conveniently fabricated as an assembly of machined members indicated as 60, 62, 64, 66 and 68 which, when assembled with intermediate gaskets 70 as shown in FIG. 1, form the body 12. The members 60–66 are provided with a plurality of holes for reception of elongated rods 72 having threaded ends on which nuts 74 are tightened to maintain the parts in assembled relation. The respective members are formed with surfaces of revolution that cooperate to define the respective passages and plenums that form the operative parts of the apparatus.

As shown in FIG. 1, the member 60 is one having a composite shape including integrally formed flange 76, alignment surface 78, recess 80 and a conical surface 82 having an elongate extension post 84 with a reduced diameter tip 86. The surface 78 is dimensioned for close clearance reception with the upper portion of a cylindrical interior surface 88 of the member 62 whereby the recess 80 in the member 60 cooperates with remainder of the surface 88 to form the discharge plenum 26 while the conical surface 82 of the member 80 cooperates with a complementary conical surface 90 on the member 62 to form the passage 18. Similarly, the radially outer surface of the member 62 is formed with an alignment surface 92, recess 94, conical wall 96 and cylindrical extension 98 for cooperation with complementary surfaces 100 and 102 on the member 64 to define the plenum 24 and passage 16. The cylindrical extension 98 on the member 62 is formed of adequate axial length to present a baffle between the passage extensions 32 and 34 that define the inlets to the respective discharge passages 26 and 18 in order to effectively separate the fluid fractions permitted to enter the discharge passages.

The radially outer surface of the member 64 is likewise provided with integrally formed alignment surface 104, recess 106 and conical wall 108 that cooperate with complementary surfaces 110 and 112 on the member 66 to form the inlet plenum 22 and passage 14.

The bottom end of the separator 10 as depicted in FIG. 1 is closed by the member 68 that forms an end plug provided with an integrally formed closure flange 116 containing a plurality of circumferentially spaced holes for reception of bolts 118 for threaded attachment, gasketed at 119, of the plug to the end face of the cylindrical extension 120 of the member 66. An alignment surface 122 on the plug 114 cooperates with the interior surface 124 of the member 66 to center the former within the latter. A reduced diameter cylindrical surface 126 on the plug 114 cooperates with the remainder of the internal surface 124 of the member 66 to define the solids discharge plenum 36 while the upper end face of the plug contains a boss 128 having a bore 130 to receive the tip 86 of the member 60 in order to render the members that form the body 12 structurally concentric.

The disclosed separator provides a compact, functionally efficient device without moving parts for cleaning liquid carrying entrained solids and gases. The structural configuration of the members makes it particularly effective in cleansing liquids conducted at low pressures since processing of the liquids occurs without an attendant loss of an appreciable amount of pressure energy or the establishment of eddies within the flowing fluid. Responsible for this is the fact that the members which, when assembled, define a structure essentially devoid of sharp edges and abrupt changes in flow passage cross-section which might otherwise generate eddy currents and cavitation in the flowing fluid. Moreover, the discharge passages are designed as energy recovery sections wherein pressure energy lost in increasing the rotational velocity of the fluid in passage 14 for separation purposes is recovered in the passages 16 and 18 prior to discharge from the separator apparatus.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. Apparatus for separating solids and gaseous contaminants from a flowing fluid comprising:
   an axisymmetric body;
   at least three annular plenums located at axially spaced positions within said body, one of said plenums being a process fluid inlet plenum and the others being fluid discharge plenums;
   process fluid inlet supply means communicating with said process fluid inlet plenum, said means including means for inducing a free vortex flow in the process fluid admitted thereto;
   an annular process fluid inlet passage extending through said body, said process fluid inlet passage communicating at one end with said process fluid inlet plenum and terminating at its other end in an annular discharge plenum, said passage between said inlet and discharge plenums being formed by a pair of concentrically spaced, conically formed walls extending generally axially of said body and radially inwardly in the fluid flow sense toward the axis thereof; and
   each of said fluid discharge plenums communicating with one end of an annular fluid conducting passage, the other end of each of which fluid conducting passages communicating with said process fluid inlet passage at radially spaced positions therealong.

2. Apparatus according to claim 1 in which each of said annular fluid-conducting passages comprises a pair of concentrically spaced, conically formed walls extending axially and radially outwardly in the fluid flow sense from the axis of said body between said process fluid inlet passage and said fluid discharge plenums.

3. Apparatus according to claim 2 in which said body is defined by a mechanically tied assemblage of axially stacked, discreet members of composite shape having complimentary surfaces cooperating to define said plenums and passages.

4. Apparatus according to claim 3 in which the members at opposite ends of said body each define end closures for said body and comprise an axially elongated post on one of said members for reception in a bore in the other of said members to maintain the concentricity of the body.

5. Apparatus according to claim 2 including fluid discharge lines communicating tangentially with the respective of said fluid discharge plenums.

* * * * *